(12) United States Patent
Park et al.

(10) Patent No.: US 11,924,114 B2
(45) Date of Patent: Mar. 5, 2024

(54) DEVICE AND METHOD FOR PROCESSING DATA PACKET

(71) Applicant: Samsung Electronics Co., Ltd., Suwon-si (KR)

(72) Inventors: Jongeon Park, Suwon-si (KR); Sangyeop Lee, Suwon-si (KR); Geumhwan Yu, Suwon-si (KR); Soukjin Bae, Suwon-si (KR); Chihun Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 17/250,601

(22) PCT Filed: Apr. 23, 2019

(86) PCT No.: PCT/KR2019/004842
§ 371 (c)(1),
(2) Date: Feb. 8, 2021

(87) PCT Pub. No.: WO2020/032345
PCT Pub. Date: Feb. 13, 2020

(65) Prior Publication Data
US 2021/0297360 A1 Sep. 23, 2021

(30) Foreign Application Priority Data
Aug. 8, 2018 (KR) .................. 10-2018-0092359

(51) Int. Cl.
*H04L 47/32* (2022.01)
*H04L 43/0888* (2022.01)

(52) U.S. Cl.
CPC .......... *H04L 47/32* (2013.01); *H04L 43/0888* (2013.01)

(58) Field of Classification Search
CPC ....... H04L 1/1848; H04L 47/27; H04L 47/34; H04L 49/9089; H04L 43/0888;
(Continued)

(56) References Cited

U.S. PATENT DOCUMENTS 7,165,129 B1 * 1/2007 Okmianski ......... G06F 12/0868
711/135
7,921,328 B1 4/2011 Gulati et al.
(Continued)

FOREIGN PATENT DOCUMENTS

CN 101044737 A 9/2007
CN 103179613 A 6/2013
(Continued)

OTHER PUBLICATIONS

Supplementary European Search Report dated Aug. 24, 2021 in connection with European Patent Application No. 19 84 8191, 12 pages.
(Continued)

*Primary Examiner* — Jason E Mattis
*Assistant Examiner* — Bao G Nguyen

(57) ABSTRACT

An electronic device, according to various embodiments of the present invention, comprises a network connection device, at least one processor, and a memory operatively connected to the at least one processor, wherein the memory stores instructions which, when executed, cause the at least one processor to: receive a data packet from the network connection device; add the data packet to a packet list corresponding to the data packet; and when the number of data packets included in the packet list is less than a threshold value, flush the data packets to a network stack on the basis of a flush time value for controlling a packet aggregation function, wherein the flush time value may be determined on the basis of the network throughput.

14 Claims, 8 Drawing Sheets

(58) Field of Classification Search
CPC .............. H04L 49/9057; H04L 49/9026; H04L 49/9084; H04L 47/32; H04L 47/562; H04W 24/04; H04W 28/0242; H04W 28/065

See application file for complete search history.

(56) References Cited

U.S. PATENT DOCUMENTS

| | | | | |
|---|---|---|---|---|
| 8,402,226 | B1* | 3/2013 | Faibish | G06F 12/0804 |
| | | | | 711/143 |
| 10,003,677 | B2 | 6/2018 | Rahamim et al. | |
| 2006/0104303 | A1 | 5/2006 | Makineni et al. | |
| 2007/0198737 | A1 | 8/2007 | Xu et al. | |
| 2007/0255802 | A1 | 11/2007 | Aloni et al. | |
| 2007/0297435 | A1 | 12/2007 | Bucknell et al. | |
| 2010/0094982 | A1 | 4/2010 | Budhia et al. | |
| 2012/0284544 | A1* | 11/2012 | Xian | G06F 3/061 |
| | | | | 711/159 |
| 2014/0064299 | A1 | 3/2014 | Shojania et al. | |
| 2016/0234127 | A1* | 8/2016 | Agarwal | H04L 67/5682 |
| 2017/0039136 | A1* | 2/2017 | Sterns | G06F 12/0875 |
| 2017/0295516 | A1* | 10/2017 | Gao | H04L 1/1848 |
| 2017/0366605 | A1 | 12/2017 | Chang et al. | |
| 2019/0334803 | A1* | 10/2019 | Ickin | H04N 21/44004 |

FOREIGN PATENT DOCUMENTS

| | | |
|---|---|---|
| CN | 106375233 A | 2/2017 |
| KR | 10-2007-0084105 A1 | 8/2007 |
| KR | 10-1458436 B1 | 11/2014 |
| WO | 2016177435 A1 | 11/2016 |
| WO | 2018086713 A1 | 5/2018 |

OTHER PUBLICATIONS

International Search Report and Written Opinion of the International Searching Authority in connection with International Application No. PCT/KR2019/004842 dated Aug. 6, 2019, 8 pages.
Communication pursuant to Article 94(3) EPC dated Mar. 6, 2023, in connection with European Application No. 19848191.3, 9 pages.
Notice of Preliminary Rejection dated Apr. 5, 2023, in connection with Korean Application No. 10-2018-0092359, 10 pages.
Notice of Patent Grant dated Oct. 10, 2023, in connection with Korean Patent Application No. 10-2018-0092359, 5 pages.
Office Action dated Nov. 4, 2023, in connection with Chinese Patent Application No. 201980053443.8, 14 pages.

* cited by examiner

DEVICE AND METHOD FOR PROCESSING DATA PACKET

CROSS-REFERENCE TO RELATED APPLICATIONS

This application is a 371 National Stage of International Application No. PCT/KR2019/004842, filed Apr. 23, 2019, which claims priority to Korean Patent Application No. 10-2018-0092359, filed Aug. 8, 2018, the disclosures of which are herein incorporated by reference in their entirety.

BACKGROUND

1. Field

The disclosure relates to a method and an apparatus for processing a received data packet.

2. Description of Related Art

An electronic device may process a data packet received from another electronic device. The electronic device may merge data packets received from a communication modem, and may transfer the merged data packets to a higher layer.

SUMMARY

Upon initial network transmission, responses to packets that require responses may not be transmitted due to the time spent merging the same, and thus transmission speed may be decreased.

On the other hand, if the amount of data to be transmitted is small, transmission speed may be decreased due to packet merging. An aspect of the disclosure is to provide a method and apparatus for merging data packets in consideration of network throughput.

Another aspect of the disclosure is to provide a method and apparatus for flushing data packets at an effective point in time.

Another aspect of the disclosure is to provide a method and apparatus for performing a packet merge function based on network throughput in a wireless communication system.

Another aspect of the disclosure is to provide a method and apparatus for determining a flush time for controlling a packet merge function in a wireless communication system.

In accordance with an aspect of the disclosure, an electronic device may include: a network connection device; at least one processor; and a memory operatively connected to the at least one processor, wherein the memory stores instructions that, when executed, enable the at least one processor to: receive a data packet from the network connection device; add the data packet to a packet list corresponding to the data packet; and if the number of data packets included in the packet list is less than a threshold value, flush the data packets to a network stack based on a flush time value for controlling a packet merge function, and wherein the flush time value is determined based on network throughput.

In accordance with another aspect of the disclosure, an operation method of an electronic device may include: receiving a data packet from a network connection device, adding the data packet to a packet list corresponding to the data packet, and, if the number of data packets included in the packet list is less than a threshold value, flushing the data packets to a network stack based on a flush time value for controlling a packet merge function, wherein the flush time value is determined based on network throughput.

In accordance with another aspect of the disclosure, an electronic device may include a network connection device, at least one processor, and a memory that is operatively connected to the at least one processor, wherein the memory may store instructions that, when executed, enable the at least one processor to: obtain a first network throughput; flush first data packets received from the network connection device to a network stack based on the first network throughput; obtain a second network throughput, higher than the first network throughput; and merge second data packets received from the network connection device based on the second network throughput and flush the same to the network stack.

According to various embodiments of the disclosure, there are provided a method and apparatus for increasing network throughput by adaptively performing a packet merge function.

Advantageous effects obtainable from the disclosure may not be limited to the above mentioned effects, and other effects which are not mentioned may be clearly understood, through the following descriptions, by those skilled in the art to which the disclosure pertains.

DETAILED DESCRIPTION

Hereinafter, various embodiments will be described in detail with reference to attached drawings.

Figure 1:
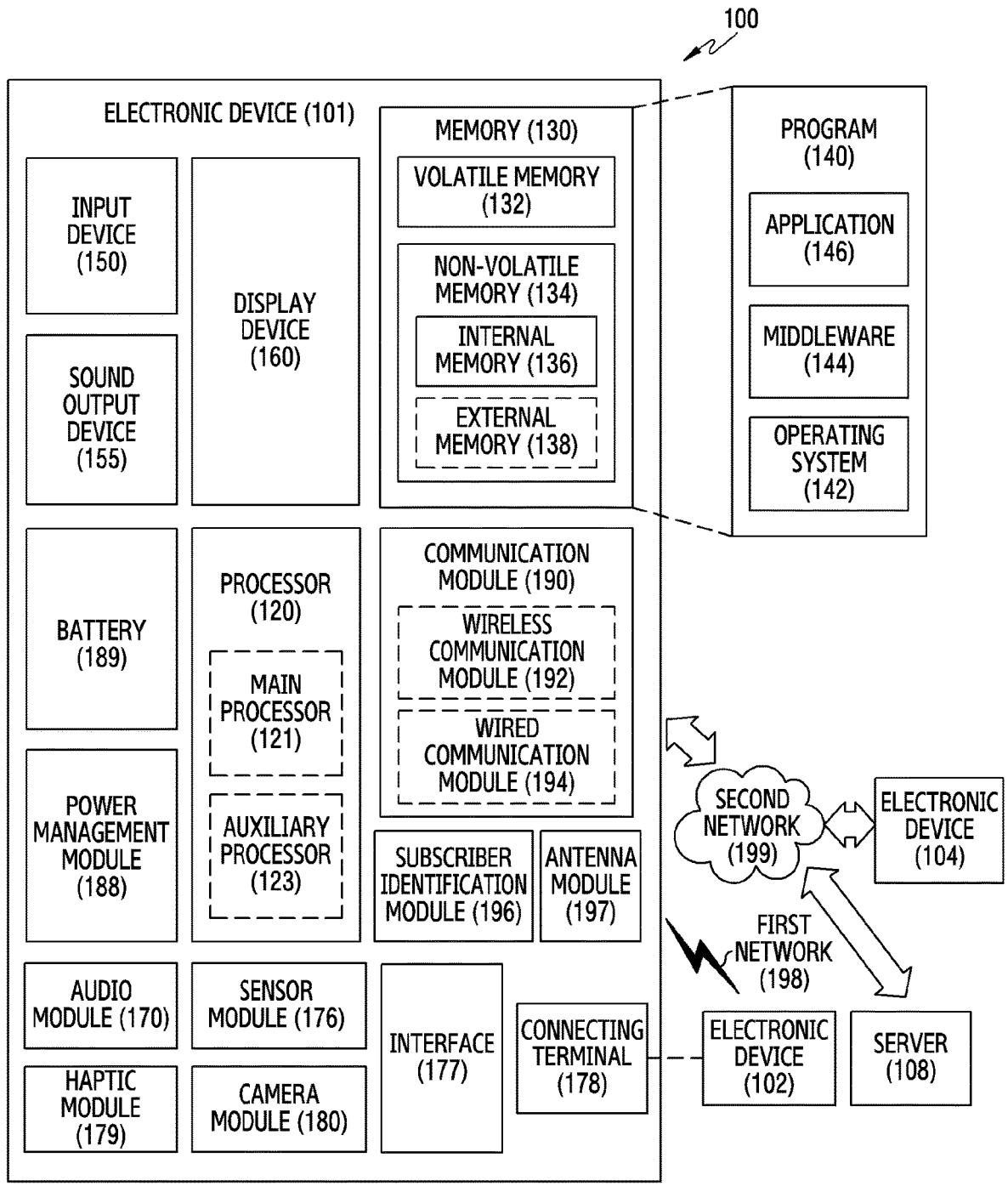
FIG. 1 is a block diagram illustrating an electronic device in a network environment according to various embodiments

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
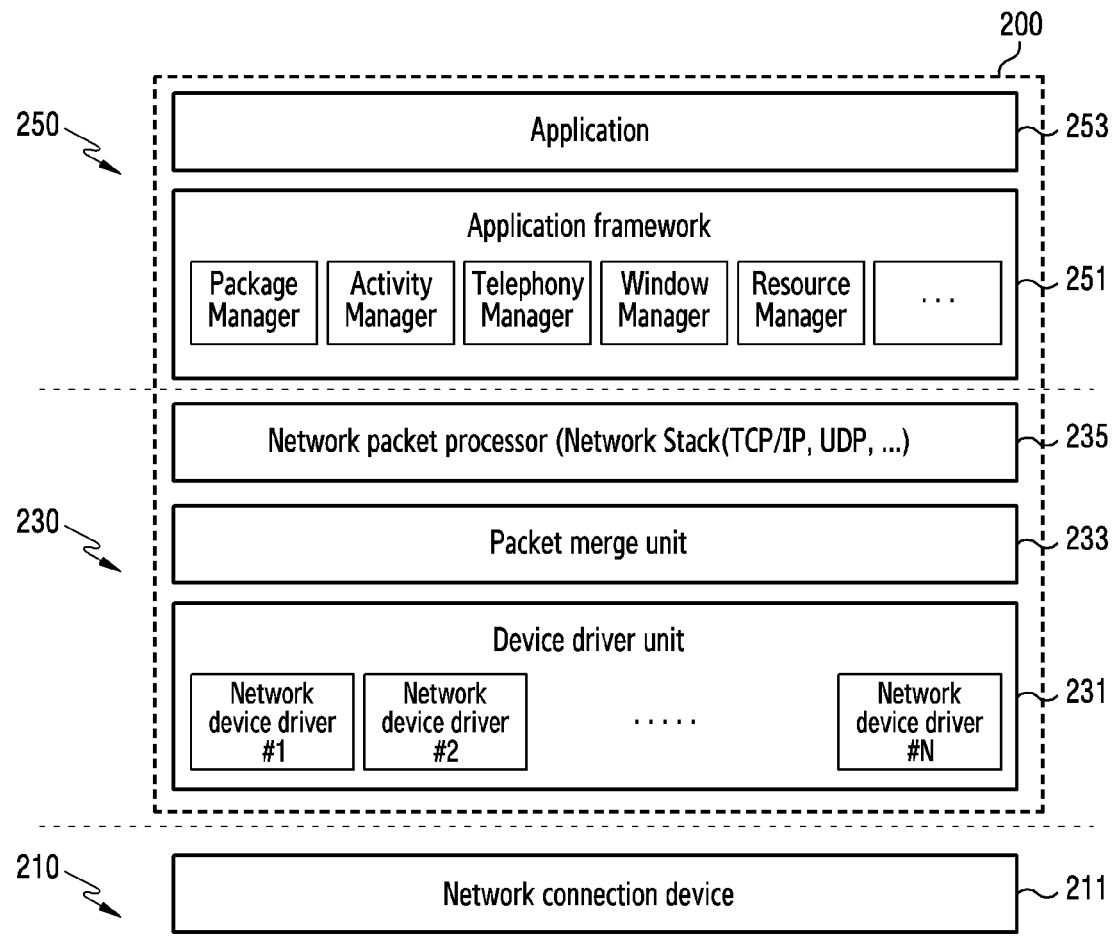
FIG. 2 is a diagram illustrating a hierarchical configuration for packet processing according to various embodiments.

FIG. 2 is a diagram illustrating a hierarchical configuration for packet processing according to various embodiments.

Referring to FIG. 2, an electronic device (e.g., the electronic device 101 of FIG. 1) according to various embodiments may include a device area 210 for packet transmission or reception, a kernel area 230, and a user area 250. Operations performed in the kernel area 230 and the user area 250 may be implemented by a processor (e.g., the processor 120 of FIG. 1). The processor 120 may perform operations and functions in the kernel area 230 and the user area 250 by implementing software 200 (e.g., the program 140 of FIG. 1). The instructions related to the above functions may be stored in a memory (e.g., the memory 130 of FIG. 1).

According to various embodiments, the device area 210 may provide operation of a hardware device for transmitting or receiving a packet. The device area 210 may include a network connection device 211 (e.g., a network interface controller (NIC)) or a modem. The network connection device 211 may be a hardware device for converting a packet to be transferred via a network into a signal or a bitstream, and physically transmitting or receiving the same. The packet may be a data packet that a transmission end desires to transfer to a reception end.

According to various embodiments, an application processor (AP) (e.g., the processor 120 of FIG. 1) may receive a packet via the network connection device 211 (e.g., the communication module 190 of FIG. 1), and may transmit a packet via the network connection device 211. For example, the network connection device 211 may be included in a communication processor (CP) (e.g., the sub-processor 123 of FIG. 1). Via the network connection device 211, an AP may transmit a packet to an external electronic device (e.g., the electronic device 102 or 104 of FIG. 1, or a server (e.g., the server 108 of FIG. 1)), and may receive a packet transmitted from an external electronic device or a server.

According to various embodiments, the kernel area (kernel layer) 230 may be included in an operating system (OS) (e.g., the operating system 142 of FIG. 1) of the electronic device. The kernel area (kernel layer) 230 may provide a function for controlling packet processing. The kernel area (kernel layer) 230 may include various modules for processing a received packet. The kernel area 230 may include a device driver unit 231, a packet merge unit 233, and a network packet processor 235.

According to various embodiments, the device driver unit 231 may process a received packet so that the received packet is processible in a higher layer. The device driver unit 231 may process a packet in a manner appropriate for the operating system that the electronic device 101 currently runs. The device driver unit 231 may include one, or two or more, network device drivers (network device driver #1, network device driver #2, . . . , to network device driver #N). A network device driver may receive a packet according to a communication protocol defined by the manufacturer of the network connection device 211. Device drivers of network devices (e.g., a modem, a LAN card, Bluetooth, nearfield communication (NFC), Wi-Fi, a display, audio, and video) may be included in the network device driver. The network connection device 211 may generate an interrupt (e.g., a hardware interrupt request (HW IRQ)), when transmitting a packet(s) to the processor 120. A network device driver may receive packets together with an interrupt. Each network device driver may process received packets into structures. The structures may be stored in a buffer for network processing. The buffer may be configured in the form of a list for a packet merge function described below. Hereinafter, the operation of processing a packet into a structure and storing the structure may be referred to by the name of "packet structuralization".

According to various embodiments, the packet merge unit 233 may perform a packet merge function. The packet merge unit 233 may transfer received packets to a higher layer (e.g., the network packet processor 235). The packet merge unit 233 may transfer structuralized packets received from the device driver unit 231 to a higher layer. The packet merge unit 233 may merge received packets and may transmit the same. The packet merge function may be a scheme that merges (or binds) consecutive packet data, having the same IP/TCP header information, into a single packet when receiving network device driver packets, and delivers the merged packets to a network stack. The packet merge unit 233 may merge received packets, and may transfer the same to a higher layer all at once, thereby reducing the load on the network packet processor 235. In addition, via the packet merge function, the number of responses (e.g., acknowledge (ACK)) to received packets is reduced, and thus, the load on the network connection device 211 may be reduced. As the overall load on a system is decreased, throughput efficiency may be increased. Accordingly, throughput (Tput) may be increased.

According to various embodiments, the packet merge unit 233 may immediately deliver received packets to a higher layer (e.g., a transmission control protocol (TPC)/Internet protocol (IP) layer). If a notification indicating that reception of packets is complete is received, or if a predetermined condition is satisfied, the packet merge unit 233 may immediately deliver the received packets to a higher layer.

According to various embodiments, the operation in which the packet merge unit 233 merges received packets and transmits the merged packets to a higher layer, or immediately delivers received packets to a higher layer, may be referred to as a "flush". A "flush" may be an operation of delivering structures stored in the buffer of the packet merge unit 233 to a higher layer. The packet merge unit 233 may store structures in the form of a list in the buffer so that the structures correspond to a stream (e.g., a TPC stream). The packet merge unit 233 may include a packet list corresponding to each stream.

According to various embodiments, the packet merge function may be referred to as "offload" or "receive offload". The packet merge function may be performed as a function defined in the OS that currently runs in the electronic device 101. For example, the packet merge function may include "generic receiver offload (GRO)" of Linux™. As another example, the packet merge function may be "receive segment coalescing (RSC)" of Windows™.

According to various embodiments, the network packet processor 235 may process a packet received from the packet merge unit 233. The network packet processor 235 may include a network stack. The network packet processor 235 may include a network layer (e.g., an internet protocol (IP) or an internet control message protocol (ICMP) layer) and a transport layer (a transmission control protocol (TCP) or a user datagram protocol (UDP) layer). The network packet processor 235 may receive a packet from the network connection device 211 via the device driver unit 231 and the packet merge unit 233. The network packet processor 235 may process a received packet so that the received packet is processible in the user area, and may transfer the processed packet to the user area. For example, in the IP layer, the network packet processor 235 may perform IP routing. In addition, for example, in the TCP layer, the network packet processor 235 may identify a TCP control block. The network packet processor 235 may identify the IP and port number of a corresponding packet.

According to various embodiments, the user area (user layer) 250 may perform operations that use packets delivered from the kernel area 230. In the user area (user layer) 250, delivered packets may be used appropriately for the purpose of applications that operate in the user layer. For example, a message may be displayed to a user of the electronic device 101, or a video streaming service may be provided. The user area 250 may include an application framework 251 and applications 253.

According to various embodiments, the applications 253 may operate in an operating system (e.g., the operating system 142 of FIG. 1) for controlling resources related to the electronic device and/or an operating system. The operating system may include, for example, Android™, Linux™, iOS™, Windows™, Symbian™, Tizen™, or Bada™. The application framework 251 may provide a function required by the applications 253 in common, or may provide various functions to the applications 253 to enable the applications 253 to use the limited system resources within the electronic device.

According to various embodiments, packets received from the network connection device 211 may be transferred to the packet merge unit 233 and the network stack 235 via the device driver unit 231 of the software 200 (e.g., the program 140), and applications may use packets processed in the network stack.

According to various embodiments, the packet merge function provided in the packet merge unit 233 may bind many received packets into one and may transfer the same to the network stack all at once, thereby reducing the processing load on the network stack. A MTU may be the maximum transmission unit of a packet that is capable of being transmitted to a network layer (e.g., the IP layer of the network stack). If a packet merge function is not applied, a network device driver may transfer a packet having a size less than or equal to the MTU to the network stack. If the packet merge function is applied, the size of a packet flushed to the network stack may exceed the maximum transmission unit (MTU). If the packet merge function is applied, the load of the network stack of the system may be reduced, and a small number of responses (ACKs) to packets may be transferred to a server side, and thus the load on data transmission hardware, such as an NIC or a modem, and on all network processors may be reduced. However, if the packet merge unit 233 uniformly binds packets and transfers the same to a higher layer, the network speed may not be promptly increased when the network speed is low (e.g., initial packet transmission).

According to various embodiments, a transmission protocol, such as TCP, may increase the size of a window every time an ACK is received for congestion control. For example, upon initial transmission, the transmission protocol may exponentially increase a window size every time an ACK is received, until the window size exceeds a threshold value. For example, upon initial transmission, the more quickly a response to a transmitted packet is provided, the greater the increase in network speed. However, if the number of responses (ACK) to be transmitted is small, the network speed may be only slightly increased. Accordingly the time taken to start an initial screen when a streaming video is played may be long. For example, if an ACK is transmitted once for a plurality of packets which are merged, as opposed to transmitting an ACK for each received packet, the transmission end may increase the size of a window in consideration of the fact that the ACK is transmitted once. If a packet merge function is applied, the number of times that an ACK is produced may be reduced, and thus throughput may be lower than the case in which the packet merge function is not applied. With better network conditions, the number of times an ACK is produced is increased. Accordingly, throughput may be decreased by a packet merge function.

According to various embodiments of the disclosure, packets may be adaptively merged based on a network speed and may then be transferred to a higher layer, or received packets may be immediately transferred to a higher layer, and thus throughput may be improved. Hereinafter, an operation in which the packet merge unit 233 transfers packets (e.g., merged packets) to a higher layer may be referred to as a "flush" operation. According to various embodiments, the electronic device may measure network throughput. In addition, according to various embodiments, the electronic device may perform "flushing" based on the measured throughput. Hereinafter, FIG. 3 describes operations for performing flushing based on network throughput by an electronic device according to various embodiments.

Figure 3:
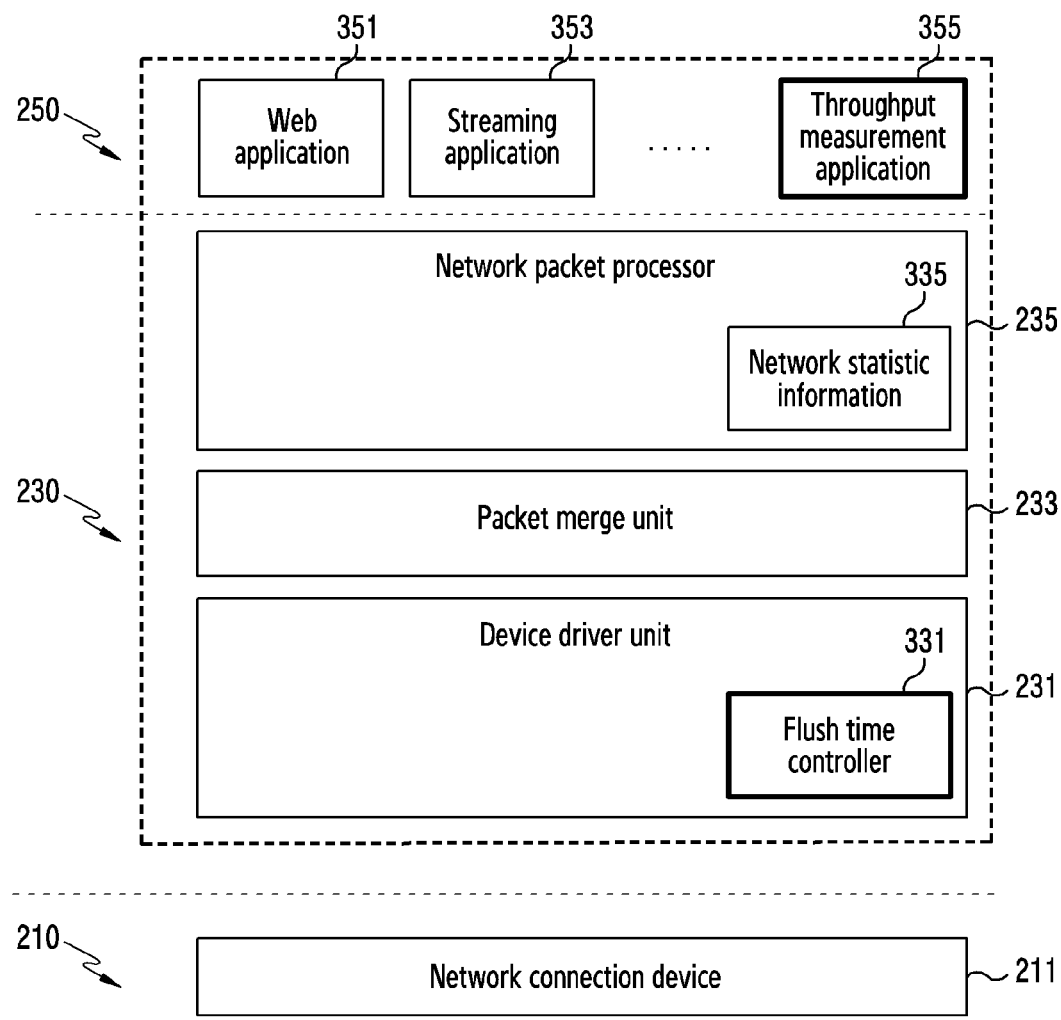
FIG. 3 is a diagram illustrating an example of throughput-based packet processing according to various embodiments.

FIG. 3 is a diagram illustrating an example 300 of throughput-based packet processing according to various embodiments.

Referring to FIG. 3, the device driver unit 231 of an electronic device (e.g., the electronic device 101 of FIG. 1) may include a flush time controller 331. The network packet processor 235 of the electronic device 101 may provide network statistic information 335. The electronic device 101 may include a web application 351, a streaming application 353, and a throughput measurement application 355 in the user area 250. Although not illustrated, the user area 250 may further include various applications (e.g., a game application).

According to various embodiments, the electronic device 101 may measure network throughput using the throughput measurement application 355. The network throughput may include the number of packets processed per unit time. The network throughput may include a network speed. The network speed may include the speed of packets that pass through a network layer. The throughput measurement electronic device 101 may use the network statistic information 335 in order to measure a network speed. The network statistic information 335 may include statistic information associated with packets processed in the network packet processor 235. For example, the network statistic information 335 may include information associated with the throughput of packets in a predetermined interval, the size of packets transferred (e.g., whether the size exceeds the maximum transmit unit (MTU)), and the like. Network throughput may be measured periodically. For example, throughput may be measured every second.

According to various embodiments, a flush time may be determined based on a measured network throughput. The flush time may be a time for controlling a packet merge function. Every time a received packet is processed, the electronic device 101 may determine whether a flush time has elapsed (or arrived), and if the flush time has elapsed (or arrived), the electronic device 101 may perform flushing. A flush time value may be determined based on a throughput value measured by the throughput measurement application 355. For example, a table that shows the relationship between a measured network throughput and a flush time may be defined. For example, the electronic device may store the table in the memory 130.

According to various embodiments, the flush time controller 331 of the electronic device 101 may perform flushing based on a determined flush time. The flush time controller 331 may operate in a network device driver of the electronic device 101. When processing a received packet, the flush time controller 331 may determine whether a flush time has elapsed from a previous flush time up to the current time. If the corresponding time has elapsed, that is, if a flush condition is satisfied, the flush time controller 331 may perform flushing. If flushing is performed, the packets processed (e.g., merged) in the packet merge unit 233 up to the current time may be transferred to a higher layer. If the corresponding flush time has not elapsed, that is, if the flush condition is not satisfied, the flush time controller 331 may not perform flushing. The packets may not be transferred to a higher layer. The packets may be merged with a subsequently received packet and may then be transferred to a higher layer.

According to various embodiments, the flush time controller 331 may determine whether to perform flushing every time a packet is received so as to determine whether to flush packets that are currently pending in a buffer as structures or to continuously maintain the packets in the pending state. The flush time controller 331 may control the point in time for performing flushing by determining whether the flush condition is satisfied.

According to various embodiments, although not illustrated in FIG. 3, a network device driver (e.g., the flush time controller 331) may be configured to receive a notification from the throughput measurement application 355. For example, the electronic device 101 may register (or include in advance) a table that defines a network throughput range with the throughput measurement application 355. If a throughput value measured by the throughput measurement application falls within a predetermined interval stored in the table, the flush time controller 331 may receive a notification.

According to various embodiments, the flush time controller 331 may obtain a flush time based on a throughput value via the notification. Subsequently, if the flush condition is satisfied (e.g., if the obtained flush time exceeds the interval between a previous flush time and the current time) during packet processing, the flush time controller 331 may control the packet merge unit 233 so as to perform flushing. If the flush condition is not satisfied, the flush time controller 331 may wait until the next packet is received in the state in which the corresponding packet has been added to a packet list. For example, the packet may not be transferred to a network stack, but may be maintained in the pending state. Subsequently, if a message indicating that transmission of all packets is complete is transmitted, if packets greater than or equal to a throughput value are added to the corresponding packet list via additional packet transmission, or if the flush condition is satisfied, the packet may be transmitted to a higher layer. According to various embodiments, by controlling the point in time at which packet flushing is to be performed via adjustment of the flush time, the electronic device 101 is capable of adaptively controlling whether to perform a packet merge function.

According to various embodiments, the electronic device 101 may control a flush time so as to control the point in time at which flushing is to be performed. In order to control a flush time based on a network speed, various embodiments of the disclosure may need to perform: measuring throughput, determining a flush time based on the throughput, and providing packets to a network stack based on the flush time.

The flush time controller 331 and the throughput measurement application 355 described in connection with FIG. 3 are merely examples of operations used to describe the disclosure, and the disclosure is not limited thereto. For example, an operation of measuring throughput may be performed by another layer in addition to a throughput measurement application. For example, a function for measuring throughput may be prepared and performed in the device driver unit 231 or the packet merge unit 233 of the kernel area 230. In addition, although the flush time controller 331 is disposed in the device driver unit 231 and controls the packet merge unit 233 in a manner of calling a flush function, the flush time controller 331 may be disposed in the packet merge unit 233, and may control a packet merge function and control whether to perform flushing.

Although FIG. 3 describes a function of measuring throughput and a function of determining whether to perform flushing together, the two functions may be performed independently. That is, determining a flush time based on throughput and determining whether to perform flushing may be performed in parallel. For example, a throughput measurement operation may be performed periodically based on a predetermined time unit (e.g., one second). Determining a flush time or updating a flush time may be performed every time that network throughput is measured, or when throughput is beyond a range stored in a predetermined table. Conversely, determining whether to perform flushing may be performed when a packet is received from the network connection device 211. In order to determine whether to perform flushing, the electronic device 101 may make reference to a flush time.

According to various embodiments of the disclosure, the electronic device 101 may include the network connection device 211, at least one processor 120, and the memory 130 operatively connected to the at least one processor, wherein the memory 130 stores instructions that, when executed, enable the at least one processor to: receive a data packet from the network connection device 211 in operation 401; add the data packet to a packet list corresponding to the data packet in operation 405; and, if the number of data packets included in the packet list is less than a threshold value in operation 407, flush the data packets to a network stack 235 based on a flush time value for controlling a packet merge function in operations 409, 411, and 413, and wherein the flush time value is determined based on network throughput.

According to various embodiments of the disclosure, the instructions enable the at least one processor to: determine whether an interval between a previous processing time and a current time exceeds the flush time value, in order to flush the data packets, and flush the data packets to the network stack if the interval between the previous processing time and the current time exceeds the flush time value, wherein the previous processing time is the point in time at which flushing was last performed.

According to various embodiments of the disclosure, the instructions enable the at least one processor to store the current time in a variable buffer in which the previous processing time is stored in order to flush the data packets.

According to various embodiments of the disclosure, the instructions enable the at least one processor to wait until another data packet associated with the packet list is received if the interval between the previous processing time and the current time does not exceed the flush time value, in order to flush the data packets.

According to various embodiments of the disclosure, the network throughput is determined based on the number of packets processed per unit time in a network layer, and the flush time value is determined based on a table having stored therein information on a relationship between a network throughput range and a flush time.

According to various embodiments of the disclosure, the instructions enable the at least one processor to obtain the network throughput periodically and update the flush time value based on the obtained network throughput.

According to various embodiments of the disclosure, the instructions enable the at least one processor to: if the obtained network throughput falls within a predetermined range, generate a notification indicating that the obtained network throughput falls within the predetermined range, in order to update the flush time value; provide the generated notification to a network device driver of the electronic device; and update the flush time value via the network device driver, wherein the network device driver is configured to determine a flush time value for updating based on the notification. According to various embodiments of the disclosure, to add the data packet to the packet list corresponding to the data packet, the instructions enable the at least one processor to: structuralize the data packet; and store the structuralized data packet in the packet list in a buffer for the packet merge function.

According to various embodiments of the disclosure, the instructions enable the at least one processor to: identify the flush time value corresponding to the packet list among a plurality of flush time values, in order to flush the data packets, wherein the network throughput is determined based on the number of packets related to the packet list, which are processed per unit time in a network layer, and wherein the plurality of flush time values respectively correspond to a plurality of packet lists of the buffer.

According to various embodiments of the disclosure, the packet merge function may include generic receive offload (GRO) or receive segment coalescing (RSC), the network stack 235 may include a network layer and a transport layer, and the network connection device 211 may include a network interface controller (NIC) or a modem of the electronic device 101.

According to various embodiments of the disclosure, the instructions enable the at least one processor to: increase the flush time if the network throughput exceeds a first threshold value; and decrease the flush time if the network throughput is less than a second threshold value.

Figure 4:
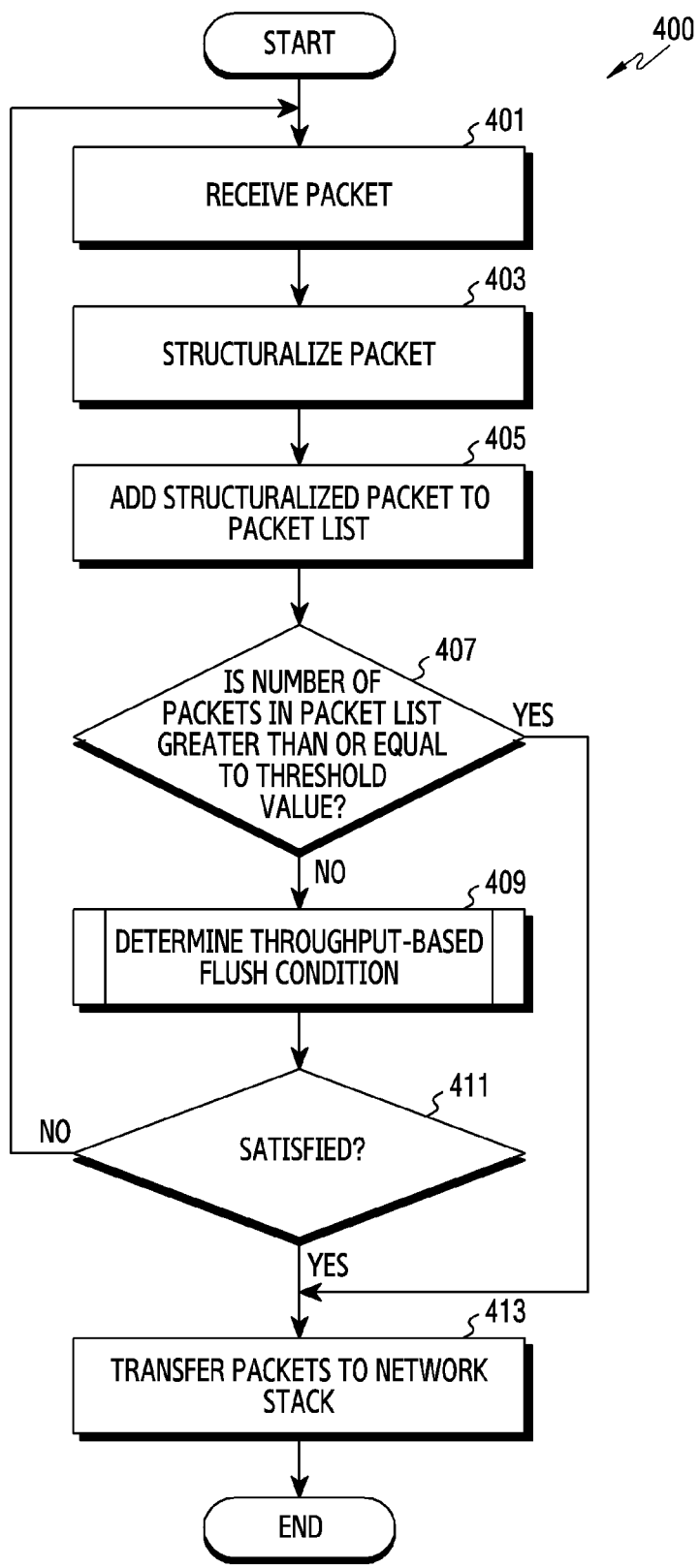
FIG. 4 is a flowchart illustrating an operation for packet processing according to various embodiments.

FIG. 4 is a flowchart 400 illustrating an operation for packet processing according to various embodiments.

Referring to FIG. 4, in operation 401, an electronic device (e.g., the electronic device 101 of FIG. 1) according to various embodiments may receive a packet. The network connection device 211 (e.g., an NIC or a modem) of the electronic device 101 may transfer a packet received from a transmission end to a device driver unit (e.g., a network device driver) of the electronic device 101. The device driver unit (e.g., the network device driver) of the electronic device 101 may deliver a packet from the network connection device 211. Although not illustrated in FIG. 4, the network connection device produces an interrupt (e.g., HW IRQ) in order to report the received packet to the processor 120. Via the interrupt, the network device driver of the electronic device may recognize processing of the received packet. The processor 120 of the electronic device 101 may receive the packet from the network connection device 211 via the network device driver.

According to various embodiments, in operation 403, the electronic device 101 may structuralize the packet in operation 403. Packet structuralization may be an operation of converting a packet into a structure in a manner appropriate for processing in a higher layer. The electronic device 101 may manage the packet provided from the network connection device 211 as a structure. For example, in the case of Linux™, the electronic device may manage packets as kernel structures which are referred to as "SKB (sk_buffer)". All modules in a network stack may process packets based on SKB. Using the network device driver, the electronic device may structuralize packets received from the network connection device 211 and may transfer the same to the packet merge unit 233.

According to various embodiments, in operation 405, the electronic device 101 may add the structuralized packet to a packet list. The packet merge unit 233 of the electronic device 101 may manage the structuralized packets for each packet list. The packet merge unit 233 may be a program that provides a packet merge function. The packet merge unit 233 may provide a buffer in order to manage the structuralized packets. The electronic device 101 may store the structuralized packets using a buffer (e.g., in the form of a list). For example, the buffer may be a GRO list. The electronic device 101 may manage packets having the same destination using a list based on the destination of each packet (e.g., an address indicated by an IP address and a port). Hereinafter, a buffer in which packets having the same destination are stored is referred to as a packet list in the description.

According to various embodiments, based on a structuralized packet, the electronic device 101 may identify a packet list corresponding to the corresponding packet. For example, the electronic device 101 may process a structuralized packet, that is, a structure, and may identify a packet list corresponding to the structure. The electronic device 101 may perform hash calculation on the structure, and may identify the packet list. The electronic device 101 may add the structuralized packet to the identified packet list. If a packet list corresponding to the corresponding packet is not retrieved from a buffer for a packet merge function, the electronic device 101 may produce a new packet list. The electronic device 101 may add the structuralized packet to the produced packet list.

According to various embodiments, in operation 407, the electronic device 101 may determine whether the number of packets in the packet list is greater than or equal to a threshold value. A packet merge function may bind structured packets and may provide the same to the network stack all at once, thereby reducing the load of processing a packet in the network stack. The electronic device 101 may determine whether the packets connected in the form of a list are greater than or equal to the threshold value. For example, the threshold value may be 64. The electronic device 101 may merge a maximum of 64 packets per packet list. If a number of packets exceeding the maximum of 64 packets (i.e., if 65 packets) are included in the packet list, the electronic device 101 may transfer the connected packets to a higher layer (or may perform flushing).

According to various embodiments, if the number of packets in the packet list is less than the threshold value (No), the electronic device 101 may proceed with operation 409. If the number of packets in the packet list is greater than or equal to the threshold value (Yes), the electronic device 101 may proceed with operation 413.

According to various embodiments, in operation 409, the electronic device 101 may determine a threshold-based flush condition. Here, the threshold-based flush condition may be a condition related to a flush time for controlling a packet merge function. For example, a flush time may be determined based on a measured throughput. In order to determine a flush condition, the electronic device 101 may obtain a flush time value determined based on throughput. For example, a flush time value may be continuously updated. In order to update a flush time value, the electronic device 101 may identify the throughput using a network throughput measurer of a system, and may update a flush time value to correspond to the defined condition. An operation of updating a flush time value according to various embodiments will be described with reference to FIG. 6.

According to various embodiments, the electronic device 101 may obtain a time value at which flushing was last performed in order to determine the period of time that has elapsed since flushing was performed. According to various embodiments, the electronic device 101 may determine whether a flush time is satisfied by determining whether the determined flush time has elapsed from the point in time at which flushing was last performed up to the current time. For example, in the state in which the number of SKB structures in a GRO list is less than 64 and the flush time has elapsed from the point in time at which the last flush is performed up to the current time, the electronic device 101 may perform control so as to call a flush function of the GRO and process the current structures in the network stack. Determining a flush condition according to various embodiments will be described with reference to FIG. 5.

According to various embodiments, in operation 411, the electronic device 101 may determine whether the flush condition is satisfied. If the flush condition is satisfied (Yes), the electronic device 101 may proceed with operation 413. If the throughput-based flush condition is not satisfied (No), the electronic device 101 may not perform flushing. The electronic device 101 may wait until a packet is received. Subsequently, when a packet is received, the electronic device 101 may perform operations 403 to 407 again after performing operation 401.

According to various embodiments, in operation 413, the electronic device 101 may transfer packets to the network stack (or may perform flushing). The electronic device 101 may transfer packets, which are managed in the packet merge unit 233, to the network stack. According to various embodiments, the electronic device 101 may flush all packets in the packet list of the corresponding packet. In addition, according to various embodiments, the electronic device 101 may flush all packets which are pending in the buffer of the packet merge unit 233, irrespective of a port.

Figure 5:
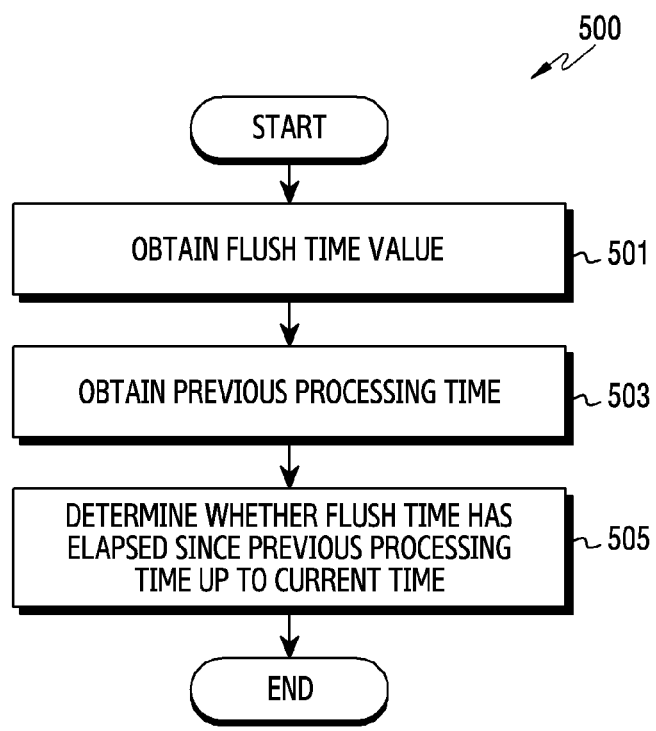
FIG. 5 is a flowchart illustrating an operation for performing determination in association with packet flushing according to various embodiments.

FIG. 5 is a flowchart 500 illustrating the operation for performing determination in association with packet flushing according to various embodiments. FIG. 5 is a part of operation 409 of FIG. 4, and an electronic device (e.g., the electronic device 101 of FIG. 1) or an element (e.g., the processor 120 of FIG. 1) of the electronic device 101 may be understood as the subject of the flowchart 500.

Referring to FIG. 5, in operation 501, the electronic device 101 (e.g., a device driver unit 231 or flush time controller 331) according to various embodiments may obtain a flush time value. The flush time value may be determined based on a throughput value obtained by network throughput measurement. The electronic device 101 may obtain the determined flush time value. According to various embodiments, if the measurement value provided from the throughput measurement application 355 is beyond a predetermined interval, the electronic device 101 may receive a notification via a network device driver. For example, in the situation in which the predetermined interval is less than or equal to 100 Mbps, the network device driver of the electronic device 101 may be configured to receive a notification from a network throughput measurer if the network throughput exceeds 100 Mbps. Based on the notification, the electronic device 101 may obtain a flush time value based on the throughput.

According to various embodiments, in operation 503, the electronic device 101 may obtain a previous processing time. Here, the previous processing time may be the point in time at which flushing was previously performed. The electronic device 101 may be configured to store the point in time at which flushing is performed. According to an embodiment, the electronic device 101 may store the point in time at which flushing is performed in the same variable buffer every time that flushing is performed.

According to various embodiments, the electronic device 101 may identify, from the storage, the point in time at which flushing was last performed. The electronic device 101 may obtain the previous processing time in order to identify the period of time that has elapsed since flushing was performed. According to various embodiments, the previous flush time may be the point in time at which flushing was last performed in association with a packet list corresponding to a packet that is currently being processed, for example, a packet list corresponding to the same port. In addition, according to various embodiments, the point in time at which the flushing was previously performed may be the point in time at which flushing was last performed in the packet merge unit 233.

According to various embodiments, in operation 505, the electronic device 101 may determine whether the period of time between the previous processing time and the current time exceeds the flush time value. If flushing is not performed during a predetermined period of time, a response (ACK) is not produced with respect to a received packet, and a network speed may become slow. Accordingly, the electronic device 101 may identify the elapsed time. The electronic device 101 may determine the difference between the previous processing time, obtained in operation 503, and the current time. The electronic device 101 may identify whether the difference value exceeds the flush time value obtained in operation 501. That is, the electronic device 101 may identify whether the period of time up to the current time since flushing was last performed exceeds the flush time value.

According to various embodiments, if the period of time up to the current time since flushing was last performed exceeds the flush time value, the electronic device 101 may determine that the corresponding condition is satisfied in operation 411 of FIG. 4. If the period of time up to the current time since flushing was last performed does not exceed the flush time value, the electronic device 101 may determine that the corresponding condition is not satisfied in operation 411 of FIG. 4.

Figure 6:
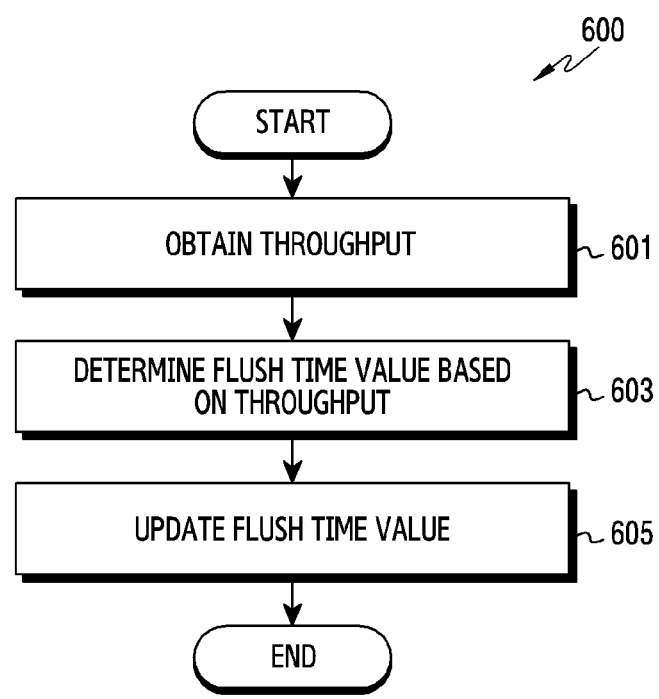
FIG. 6 is a flowchart illustrating an operation for updating a flush time according to various embodiments.

FIG. 6 is a flowchart 600 illustrating the operation for updating a flush time according to various embodiments.

Referring to FIG. 6, in operation 601, an electronic device (e.g., the electronic device 101 of FIG. 1) may obtain a throughput. According to various embodiments, the electronic device 101 may obtain the throughput using the throughput measurement application 355. For example, the throughput is network packet throughput, and may be the number of packets that come from the network packet processor 235 per unit time. The throughput may be referred to as "network throughput" or "network speed". For example, the electronic device 101 may measure and obtain throughput in units such as bits per second (bps), megabits per second (Mbps), or the like. The electronic device 101 may obtain a throughput value periodically via the throughput measurement application 355.

According to various embodiments, in some other embodiments, a function of measuring throughput may be included in the kernel area 230. For example, the electronic device 101 may measure a network speed and obtain a throughput value using the packet merge unit 233. As another example, the electronic device 101 may use a throughput measurement function via a network device driver.

According to various embodiments, the network throughput obtained in operation 601 may be a packet throughput in the entire network layer of the electronic device 101. In addition, according to various other embodiments, a network throughput obtained in operation 601 may be a packet throughput for each port depending on each port of the electronic device 101. A flush time value determined in operation 603 based on network throughput may be determined for each port. Here, a port may include a network socket port included in an IP destination address that is managed by an application allocated to the application.

According to various embodiments, in operation 603, the electronic device 101 may determine a flush time value based on throughput. The electronic device 101 may determine a flush time value based on the throughput value obtained in operation 601. According to various embodiments, a table that defines the relationship between a throughput value and a flush time value may be defined in advance. The table may be stored in, for example, a memory (e.g., the memory 130 of FIG. 1) of the electronic device 101. The table may be, for example, Table 1 provided below.

TABLE 1

| Throughput | 0~100 Mbps | 100~200 Mbps | 200 Mbps |
|---|---|---|---|
| Flush time | 0 | 10 μs | 100 μs |

The number of intervals and a flush time value for each interval defined in Table 1 are examples, and the disclosure is not limited to the table. For example, the intervals in the table which define the relationship between a throughput value and a flush time value may be configured as two intervals, or four or more intervals, instead of three intervals as shown in Table 1. In addition, other flush times, in addition to 10 μs and 100 μs, may be defined as a flush time.

According to various embodiments, network throughput may be measured for the entire network layer, irrespective of a port. In this instance, the electronic device 101 may determine a flush time corresponding to the measured network throughput. In addition, according to various other embodiments, network throughput may be measured for each port. The electronic device 101 may measure the network throughput for each port in operation 601. The electronic device 101 may determine a flush time for each port.

According to various embodiments, in operation 605, the electronic device 101 (e.g., the device driver unit 231 or flush time controller 331) may update the flush time value. When a measured flush time value is changed, the electronic device 101 may update the flush time value. According to various embodiments, the electronic device 101 may update a flush time corresponding to the entire network layer. The electronic device 101 may control a packet merge function using the determined flush time. In addition, according to various other embodiments, a network throughput may be updated for each port. The electronic device 101 may control a packet merge function by applying a flush time for each port using a flush time determined for each port.

According to various embodiments, the electronic device 101 may increase or decrease a flush time. For example, according to Table 1, if a network throughput exceeds 200 Mbps, the electronic device 101 may update a flush time from 10 μs to 100 μs. When a packet is received, the electronic device 101 may determine whether 100 us has elapsed from the point in time at which flushing was last performed up to the current time, and may determine whether to flush the received packet or to wait until another packet is received after adding the packet to a packet list associated with the corresponding packet. If a network throughput is high, a large number of responses (ACK) is relatively less requested, and thus the electronic device 101 may increase throughput efficiency by increasing the flush time. The electronic device 101 according to various embodiments may increase the flush time if it is determined that the throughput is high (e.g., exceeding a first threshold value). The electronic device 101 according to various embodiments may decrease the flush time if it is determined that the throughput is low (e.g., less than or equal to a second threshold value). By increasing or decreasing a flush time, the interval of flushing performed by the electronic device 101 may be increased or decreased.

According to various embodiments, as another example, according to Table 1, if a network throughput decreases to be less than or equal to 100 Mbps, the electronic device 101 may update a flush time from 10 μs to 0 μs. If the flush time is 0 μs, the electronic device 101 may determine to perform flushing every time that the electronic device 101 determines whether a flush condition is satisfied upon reception of a packet. For example, the electronic device 101 may add a packet received from the network connection device 211 to a packet list, and may immediately transfer the packet to the network stack 235 without waiting for the next packet. If network throughput is low, a response (ACK or NACK) to a transmission end may be requested a relatively large number of times, so the network speed accords with the channel state. The electronic device 101 may perform control so as to transmit a response for each packet more frequently by decreasing a flush time to 0 or to be lower than before.

The electronic device 101 according to various embodiments of the disclosure may adaptively configure a flush time based on network throughput, and may adaptively configure the time at which packets are to be merged and transferred. In order to adaptively configure a flush time, an operation of measuring network throughput and an operation of providing a flush time based on the measured throughput may be needed.

According to various embodiments, the function of measuring throughput and the function of providing a flush time may be implemented in the user area 250. For example, the electronic device 101 may measure a network throughput using the throughput measurement application 355 (e.g., Argos) of FIG. 3, and may determine a flush time based on the measured throughput. In addition, if the flush time needs to be updated (i.e., if a flush time value is changed), the flush time controller 331 of a network device driver and the throughput measurement application 355 may be configured so that the throughput measurement application 355 provides a notification to the flush time controller 331 of the device driver unit 231.

According to various embodiments, both the function of measuring throughput and the function of providing a flush time may be implemented in the kernel area 230. For example, the function of measuring throughput and the function of providing a flush time may be implemented as a function of a network device driver of an operator. As another example, both the function of measuring throughput and the function of providing a flush time may be implemented in the packet merge unit 233. The packet merge unit 233 may manage packets for each port, and thus, the electronic device 101 may easily calculate a throughput for each port. The electronic device 101 may additionally include a module for determining a flush time based on a throughput value obtained by the packet merge unit 233.

According to various embodiments, the function of measuring throughput may be implemented in an application, and the function of providing a flush time may be implemented in the kernel area. For example, the throughput measurement application 355 of FIG. 3 may measure a network throughput, and the device driver unit 231 or the packet merge unit 233 may determine a flush time based on the measured throughput. Although the network throughputs are the same, different flush times may be used for respective ports. According to an embodiment, the table used for determining a flush time may differ depending on the features of the application that is used for each port.

According to various embodiments, the operations for performing flushing at a given flushing time are described, and the operation of determining a flush time based on network throughput is described in connection with FIG. 6. According to various embodiments, the operations for performing flushing and the operation of determining a flush time may be performed in parallel. For example, although it is illustrated that flushing is performed based on an updated flush time value in FIGS. 4, 5, and 6, the scope of rights of the disclosure does not limit the order thereof. For example, after determining whether to perform flushing according to various embodiments, another flush time value may be updated.

According to various embodiments of the disclosure, an operation method of the electronic device 101 may include: an operation 401 of receiving a data packet from a network connection device 211, an operation 405 of adding the data packet to a packet list corresponding to the data packet, and, if a number of data packets included in the packet list is less than a threshold value in operation 407, operations 409, 411, and 413 for flushing the data packets to a network stack based on a flush time value for controlling a packet merge function, wherein the flush time value is determined based on network throughput.

According to various embodiments of the disclosure, the operation of flushing the data packets may include: an operation of determining whether an interval between a previous processing time and a current time exceeds the flush time value, and an operation of flushing the data packets to the network stack if the interval between the previous processing time and the current time exceeds the flush time value, wherein the previous processing time is the point in time at which flushing was last performed.

According to various embodiments of the disclosure, the operation of flushing the data packets may include an operation of storing the current time in a variable buffer in which the previous processing time is stored.

According to various embodiments of the disclosure, the operation of flushing the data packets may include an operation of waiting until another data packet associated with the packet list is received if the interval between the previous processing time and the current time does not exceed the flush time value.

According to various embodiments of the disclosure, the network throughput is determined based on the number of packets processed per unit time in a network layer, and the flush time value is determined based on a table including a relationship between a network throughput range and a flush time.

According to various embodiments of the disclosure, the method may further include: an operation of obtaining the network throughput periodically; and an operation of updating the flush time value based on the obtained network throughput.

According to various embodiments of the disclosure, the operation of updating the flush time value may include: if the obtained network throughput falls within a predetermined range, an operation of generating a notification indicating that the obtained network throughput falls within the predetermined range, an operation of providing the generated notification to a network device driver of the electronic device, and an operation of updating the flush time value via the network device driver, and the network device driver may be configured to determine a flush time value for updating based on the notification.

According to various embodiments of the disclosure, the operation of adding the data packet to the packet list corresponding to the data packet may include an operation of structuralizing the data packet and an operation of storing the structuralized data packet in the packet list in a buffer for the packet merge function.

According to various embodiments of the disclosure, the operation of flushing the data packet may include an operation of identifying the flush time value corresponding to the packet list, among a plurality of flush time values, and the network throughput is determined based on the number of packets related to the packet list that are processed per unit time in a network layer, and the plurality of flush time values may respectively correspond to a plurality of packet lists of the buffer.

According to various embodiments of the disclosure, the packet merge function may include generic receive offload (GRO) or receive segment coalescing (RSC), the network stack 235 may include a network layer and a transport layer, and the network connection device 211 may include a network interface controller (NIC) or a modem of the electronic device 101.

According to various embodiments of the disclosure, the method may further include: an operation of increasing the flush time if the network throughput exceeds a first threshold value; and an operation of decreasing the flush time if the network throughput is less than a second threshold value.

Figure 7:
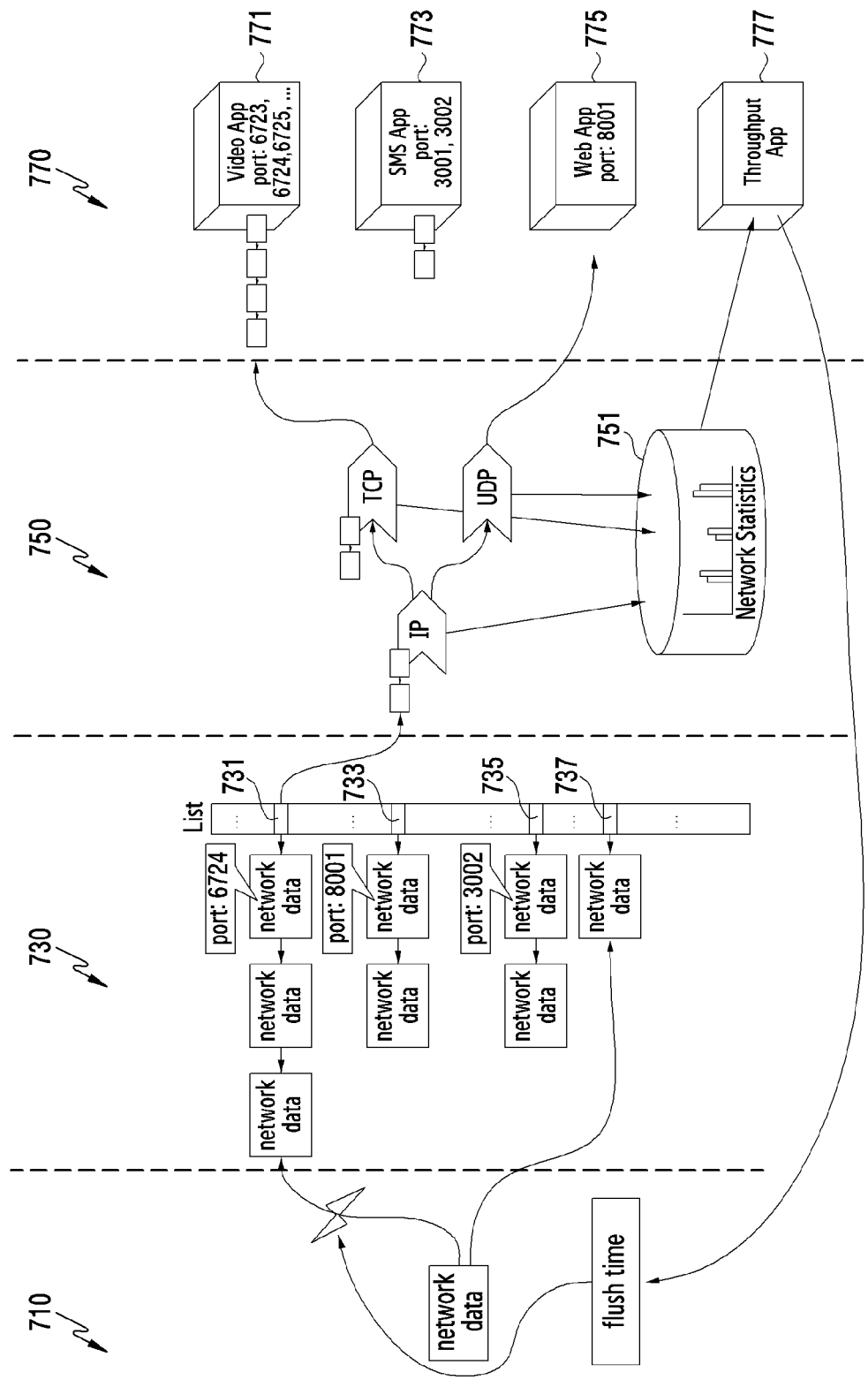
FIG. 7 is a diagram illustrating an example of packet processing according to various embodiments.

FIG. 7 is a diagram illustrating an example 700 of packet processing according to various embodiments. A network connection device (e.g., the network connection device 211 of FIG. 2) may receive network data received from a transmission end, and may provide the same to a processor (e.g., the processor 120 of FIG. 1). Hereinafter, FIG. 7 describes packet processing operations/functions 700 of the processor 120, performed in order to control a flush time. The packet processing 700 may be implemented by the processor 120 (e.g., an AP or a CP) of the electronic device 101, and may be stored in the form of software 200 in the memory 130 of the electronic device 101.

Referring to FIG. 7, the operations 700 performed in the electronic device 101 may include an operation performed in a network device driver 710, an operation performed in a packet merge unit 730, an operation performed in a network stack 750, and operations performed in applications 770.

According to various embodiments, the electronic device 101 may receive network data from the network connection device 211 using the network device driver 710. Although not illustrated in FIG. 7, the electronic device 101 may store received network data as a structure using the network device driver 710. The electronic device 101 may produce a buffer for network processing in a kernel, and may store and manage structures in the corresponding buffer.

According to various embodiments, the electronic device 101 may manage pieces of network data as lists using the packet merge unit 730. Using the packet merge unit 730, the electronic device 101 may identify address information (e.g., a port and an IP address) included in the network data, and may manage the network data having the same destination as a single list. The electronic device 101 may include packet lists for storing pieces of network data in the packet merge unit 730. The packet lists may include a first packet list 731, a second packet list 733, a third packet list 735, and a fourth packet list 737.

For example, pieces of network data corresponding to port #6742 may be connected (or added) to the first packet list 731. Pieces of network data corresponding to port #8001 may be connected to the second packet list 733. Pieces of network data corresponding to port #3002 may be connected to the third packet list 735. If a flush condition is satisfied, the electronic device 101 may perform flushing, and may transfer pieces of network data connected to each packet list to a higher layer, for example, the network stack 750.

According to various embodiments, in the network stack 750, the electronic device 101 may process data transferred from a lower layer. For example, the electronic device 101 may process the header of an IP layer, and may perform IP routing. In addition, for example, the electronic device 101 may process the header of a TCP layer, and may identify a TCP control block. In the network stack 750, the electronic device 101 may perform processing in each layer (e.g., a network layer and a transport layer), and may transfer processed packets to a higher layer (e.g., an application layer).

According to various embodiments, based on the result of processing in the network stack 750, the electronic device 101 may obtain network statistic information (network statistics) 751. The electronic device 101 may obtain the network statistic information 751 associated with at least one of network throughput, whether packet merging is performed, and the size of a transmitted packet. According to various embodiments, the statistic information 751 may be used to measure network throughput, which is to be described below.

According to various embodiments, the applications 770 may include a video application 771, a short message service (SMS) application 773, a web application 775, and a throughput application 777. Each application 770 may correspond to a destination port. For example, the first packet list 731 may correspond to the video application 771, the second packet list 733 may correspond to the web application 775, and the third packet list 735 may correspond to the SMS application 773, respectively.

According to various embodiments, the electronic device 101 may measure network throughput using the throughput measurement application 355. The electronic device 101 may determine the network throughput based on the statistic information 751 of the network stack 750. The electronic device 101 may provide the determined network throughput to the network device driver 710. According to various embodiments, if the network throughput falls within a predetermined range (e.g., an interval greater than 200 Mbps defined in Table 1), the electronic device 101 may inform the network device driver 710 of the same.

According to various embodiments, the electronic device 101 may obtain a flush time corresponding to a current network throughput via the network device driver 710. The network device driver 710 may be configured to update a flush time based on network throughput. The electronic device 101 may control whether to perform flushing using a flush time. The electronic device 101 may control a packet merge function by controlling whether to perform flushing. If the electronic device 101 determines that flushing needs to be performed, for example, if the electronic device 101 determines that a flush time has elapsed since the point in time at which flushing was last performed up to the current time, the electronic device 101 may perform flushing.

According to various embodiments, the electronic device 101 may measure the overall throughput of a network layer using the throughput application 777. For example, the electronic device 101 may measure the network throughput of all applications in the network stack 750. In addition, according to various embodiments, the electronic device 101 may measure the throughput for each port using the throughput application 777. For example, the electronic device 101 may measure the network throughput of the video application 771 at port #6724. In addition, for example, the electronic device 101 may measure the network throughput of the SMS application 773 at port #3002. The electronic device 101 may manage a flush time for each port differently based on the throughput of the corresponding port. For example, the electronic device 101 may use 10 μs as a flush time for port #6724, and may use 100 μs as a flush time for port #3002. In this instance, the electronic device 101 may receive a packet corresponding to port #3002. If the number of structures included in a packet list corresponding to port #3002 is less than 64, which is a threshold value, the electronic device 101 may determine whether to perform flushing by determining whether 100 μs has elapsed from the point in time at which flushing was last performed at port #3002 up to the current time.

Figure 8:
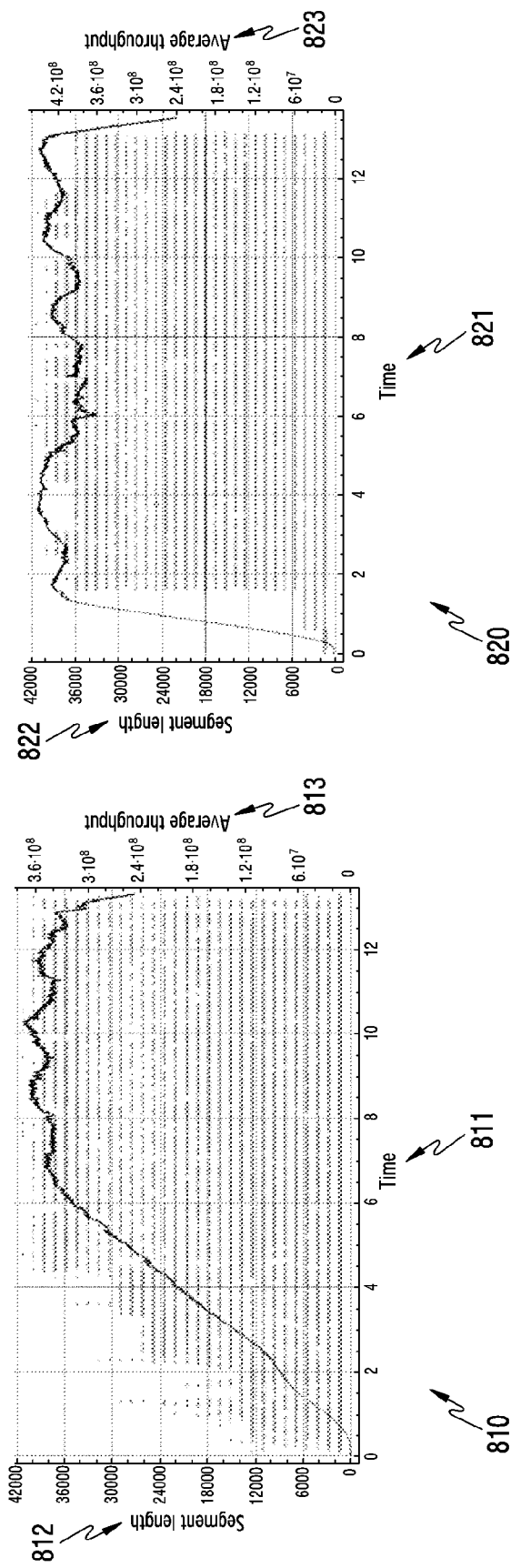
FIG. 8 is a diagram illustrating an example of the performance of packet processing according to various embodiments.

FIG. 8 is a diagram illustrating an example 800 of the performance of packet processing according to a comparative example and various embodiments. The electronic device 101 may capture network data using an application (e.g., Tcpdump). In addition, using an analysis tool (e.g., WireShark), a graph associated with the TCP throughput and the length of a TCP segment may be obtained from the captured network data.

Referring to FIG. 8, graph 810 shows throughput performance when a fixed flush time (e.g., 100 μs) is applied according to the comparative example. The bar graph in the graph 810 indicates the length of a segment over time. The line graph in the graph 810 indicates throughput performance over time. The horizontal axis 811 indicates time (unit: second). The first vertical axis 812 indicates a segment length (unit: byte). The first vertical axis is related to the bar graph. The second vertical axis 813 indicates an average throughput (unit: bps). The second vertical axis is related to the line graph.

Graph 820 shows throughput performance when a flush time based on network throughput (e.g., a flush time of Table 1, hereinafter referred to as an adaptive flush time) is applied according to various embodiments of the disclosure. The bar graph in the graph 820 indicates the length of a segment over time. The line graph in the graph 820 indicates throughput performance over time. The horizontal axis 821 indicates time (unit: seconds). The first vertical axis 822 indicates a segment length (unit: bytes). The second vertical axis 823 indicates an average throughput (unit: bps).

The segment length may indicate how many packets are merged per unit time. For example, the segment length may correspond to the number of packets merged in the packet merge unit 233. For example, in the case of GRO, a maximum of 64 SKB structures may be merged at a time. Within a short time, as many packets as possible are merged, and thus network throughput may be further improved.

Referring to the graph 810, if a fixed flush time is applied according to the comparative example, a segment length may be gradually increased for 0 to 2 seconds. The segment length may be increased up to 30000 bytes. Referring to the graph 820, if an adaptive flush time is applied according to various embodiments of the disclosure, the segment length may be increased in stages for 0 to 2 seconds. At the initial stage, the segment length may have a length less than 6000 bytes. Subsequently, the segment length may be increased up to 36000 bytes.

According to various embodiments of the disclosure, at the initial transmission, network throughput is low and a flush time may be set to 0. For example, the electronic device 101 may transfer every received packet to a higher layer via flushing. Since the electronic device 101 transmits an ACK to a transmission end in response to each received packet, the number of packets transmitted from the transmission end may also be increased. Conversely, in the case in which a fixed flush time is applied according to the comparative example, if packets are merged and transmitted at a fixed interval, the number of responses to the packets is decreased and the increase in speed may be small. Since the transmission end does not receive sufficient ACKs, the number of packets transmitted from the transmission end may be smaller than the case in which an adaptive flush time is applied. As described above, whether the disclosure is implemented may be identified based on a change in a segment length over time, as shown via the graphs 810 and 820.

According to various embodiments, a segment length, that is, the size of packets that are merged and transmitted, may be determined based on how long flushing is delayed every time a packet is received. Flushing may not be performed via operations 409 and 411, in addition to operation 407 of FIG. 4. The electronic device 101 may wait for the reception of subsequent packets. Subsequently, when packets are received, the packets may be stored in a buffer via a packet merge function, and whether to perform flushing may be determined again. For example, if a throughput-based flush condition is not satisfied in operation 411, packets that are pending may be merged with subsequently received packets.

According to various embodiments, as network throughput is lower, the flush time becomes zero or is decreased, so that packets may not be merged. As network throughput is higher, the flush time is increased, so that packets may be merged more. If packets are not merged, the size of a transmitted packet may be limited to an MTU (e.g., 1500 bytes). Therefore, whether the disclosure is implemented may be identified based on a segment length less than the MTU and a segment length greater than or equal to the MTU, which are obtained before and after a change in the network throughput. While the network throughput changes, the packet merge function may be turned on.

According to various embodiments of the disclosure, the electronic device 101 may include the network connection device 211, at least one processor, and a memory that is operatively connected to the at least one processor, and the memory may store instructions that, when executed, enable the at least one processor to: obtain a first network throughput; flush first data packets received from the network connection device to a network stack based on the first network throughput; obtain a second network throughput, which is higher than the first network throughput; and merge second data packets received from the network connection device based on the second network throughput and flush the same to the network stack.

According to various embodiments of the disclosure, the size of the second data packets may be larger than a maximum transmission unit (MTU), and the size of the first data packets may be smaller than or equal to the MTU.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising:
a network connection device;
at least one processor; and
a memory operatively connected to the at least one processor,
wherein the memory stores instructions that, when executed, enable the at least one processor to:
receive a data packet from the network connection device;
add the data packet to a packet list corresponding to the data packet; and
if a number of data packets included in the packet list is less than a threshold value, flush the data packets to a network stack based on a flush time value for controlling a packet merge function, and
wherein the flush time value is determined based on a table including a relationship between a network throughput range and a flush time corresponding to the packet list, and
wherein a network throughput is determined based on a number of packets related to the packet list, which are processed per unit time in a network layer.

2. The electronic device as claimed in claim 1, wherein the instructions enable the at least one processor to:
determine whether an interval between a previous processing time and a current time exceeds the flush time value, in order to flush the data packets; and
flush the data packets to the network stack if the interval between the previous processing time and the current time exceeds the flush time value,
wherein the previous processing time is a point in time at which flushing is most recently performed.

3. The electronic device as claimed in claim 2, wherein the instructions enable the at least one processor to store the current time in a variable buffer in which the previous processing time is stored in order to flush the data packets.

4. The electronic device as claimed in claim 2, wherein the instructions enable the at least one processor to wait until another data packet associated with the packet list is received if the interval between the previous processing time and the current time does not exceed the flush time value in order to flush the data packets.

5. The electronic device as claimed in claim 1, wherein the instructions enable the at least one processor to: obtain the network throughput periodically; and
update the flush time value based on the obtained network throughput.

6. The electronic device as claimed in claim 5, wherein the instructions enable the at least one processor to:
if the obtained network throughput falls within a predetermined range, generate a notification in order to update the flush time value indicating that the obtained network throughput falls within the predetermined range;
provide the generated notification to a network device driver of the electronic device; and
update the flush time value via the network device driver, and
wherein the network device driver is configured to determine a flush time value for updating based on the notification.

7. The electronic device as claimed in claim 1, wherein, to add the data packet to the packet list corresponding to the data packet, the instructions enable the at least one processor to:
structuralize the data packet; and
store the structuralized data packet in the packet list in a buffer for the packet merge function.

8. The electronic device as claimed in claim 7, wherein the instructions in order to update the flush time value enable the at least one processor to:
identify the flush time value corresponding to the packet list, among a plurality of flush time values,
wherein the plurality of flush time values respectively correspond to a plurality of packet lists of the buffer.

9. The electronic device as claimed in claim 1, wherein the packet merge function comprises a generic receive offload (GRO) or a receive segment coalescing (RSC),
wherein the network stack comprises a network layer and a transport layer, and
wherein the network connection device comprises a network interface controller (NIC) or a modem of the electronic device.

10. The electronic device as claimed in claim 1, wherein the instructions enable the at least one processor to:
increase the flush time value if the network throughput exceeds a first threshold value; and
decrease the flush time value if the network throughput is less than a second threshold value.

11. An operation method of an electronic device, the method comprising:
receiving a data packet from a network connection device;
adding the data packet to a packet list corresponding to the data packet; and
if a number of data packets included in the packet list is less than a threshold value, flushing the data packets to a network stack based on a flush time value for controlling a packet merge function,
wherein the flush time value is determined based on a table including a relationship between a network throughput range and a flush time corresponding to the packet list, and
wherein a network throughput is determined based on a number of packets related to the packet list, which are processed per unit time in a network layer.

12. The method as claimed in claim 11, wherein the flushing the data packets comprises:
determining whether an interval between a previous processing time and a current time exceeds the flush time value; and
flushing the data packets to the network stack if the interval between the previous processing time and the current time exceeds the flush time value,
wherein the previous processing time is a point in time at which flushing is most recently performed.

13. The method as claimed in claim 12, wherein the flushing the data packets comprises:
storing the current time in a variable buffer in which the previous processing time is stored.

14. The method as claimed in claim 12, wherein the flushing the data packets comprises:
waiting until another data packet associated with the packet list is received if the interval between the previous processing time and the current time does not exceed the flush time value.

\* \* \* \* \*